United States Patent
Miller et al.

(10) Patent No.: US 7,487,216 B2
(45) Date of Patent: Feb. 3, 2009

(54) SYSTEM AND METHOD FOR MANAGING DISPLAY OF A MULTIPLE MESSAGE ELECTRONIC MAIL THREAD

(75) Inventors: Jeffrey Randolph Miller, Natick, MA (US); Harsha Ramalingham, Hopkinton, MA (US)

(73) Assignee: International Business Machines Corporation, Armonk, NY (US)

( * ) Notice: Subject to any disclaimer, the term of this patent is extended or adjusted under 35 U.S.C. 154(b) by 856 days.

(21) Appl. No.: 11/037,773

(22) Filed: Jan. 18, 2005

(65) Prior Publication Data

US 2006/0161849 A1 Jul. 20, 2006

(51) Int. Cl.
*G06F 15/16* (2006.01)
*G06F 12/00* (2006.01)
(52) U.S. Cl. ...................... 709/206; 709/207
(58) Field of Classification Search .............. 709/206, 709/203, 207, 249, 250
See application file for complete search history.

(56) References Cited

U.S. PATENT DOCUMENTS

| | | | |
|---|---|---|---|
| 6,963,902 B2 * | 11/2005 | Bates et al. | 709/206 |
| 7,266,584 B2 * | 9/2007 | Mullen et al. | 709/206 |
| 2002/0029247 A1 * | 3/2002 | Kawamoto | 709/206 |
| 2002/0073117 A1 * | 6/2002 | Newman | 707/513 |
| 2002/0073157 A1 | 6/2002 | Newman et al. | |
| 2004/0044735 A1 * | 3/2004 | Hoblit | 709/206 |
| 2006/0168025 A1 * | 7/2006 | Jain | 709/206 |

OTHER PUBLICATIONS

Kerr, Bernard, "Thread Arcs: An Email Thread Visualization" Collaborative User Experience Group, IBM Research, Article.

* cited by examiner

*Primary Examiner*—Zarni Maung
(74) *Attorney, Agent, or Firm*—Matthew W. Baca; Dillon & Yudell LLP (57) ABSTRACT

A system, method and computer program product for managing display of a multiple message e-mail thread. In accordance with the method of the invention, an e-mail message is accessed by an e-mail thread display module. The e-mail message includes multiple sections each having an associated section header including one or more header attributes. A user display preference based on one or more of the header attributes is received and the e-mail message is displayed on a display device in accordance with the received user display preference.

3 Claims, 10 Drawing Sheets

SYSTEM AND METHOD FOR MANAGING DISPLAY OF A MULTIPLE MESSAGE ELECTRONIC MAIL THREAD

BACKGROUND OF THE INVENTION

1. Technical Field

The present invention relates generally to the field of electronic mail, and in particular to techniques for arranging the display of electronic mail message that contains multiple appended messages. More particularly, the present invention relates to a method and system for adapting the display of a multiple message electronic mail thread in accordance with user-specified or autonomic header attribute processing techniques.

2. Description of the Related Art

Electronic mail, commonly referred to as e-mail, is a ubiquitous computer application that according to some estimates constitutes more than 50% of the average person's computer usage. Any mechanism with which e-mail usage can be made more efficient is therefore a welcome improvement, potentially having a dramatic cumulative impact on workplace and general end-user efficiency.

Many improvements in e-mail technology relate to providing the e-mail user with e-mail addressing and formulation tools to increase the efficiency of e-mail drafting and delivery. This is particularly true in the case of the e-mail thread, which is essentially an e-mail "conversation" occurring among two or more e-mail client stations. For example, when an e-mail message is received by a recipient networked computer, well-known e-mail client tools enable the recipient to strategically utilize portions of the content of the received message to respond in some manner. Typical of such options are a "reply to sender" option, a "reply to all" option, a "forward" option, etc. One advantageous feature of such e-mail functions is shared by the "reply" options which provide the message recipient with a convenient reply graphical user interface (GUI) in which some or all of the e-mail address content included in the received message is conveniently pre-loaded into the "send to" address field, thus relieving the recipient/replier from having to manually enter the address information. A more significant advantageous feature shared by the "forward" option as well as the "reply" options is that the message content of the original sender's message can automatically or optionally be included and appended onto the reply message drafted by the message recipient to be sent to one or more subsequent recipients.

This technique of incrementally building an e-mail thread comprising an appended list of messages that each, except for one "original," are drafted somewhere along the message stream is well-known to most e-mail users. The many advantages of such cumulative appending of messages in any number of e-mail discourse scenarios is self-evident.

Figure 1:
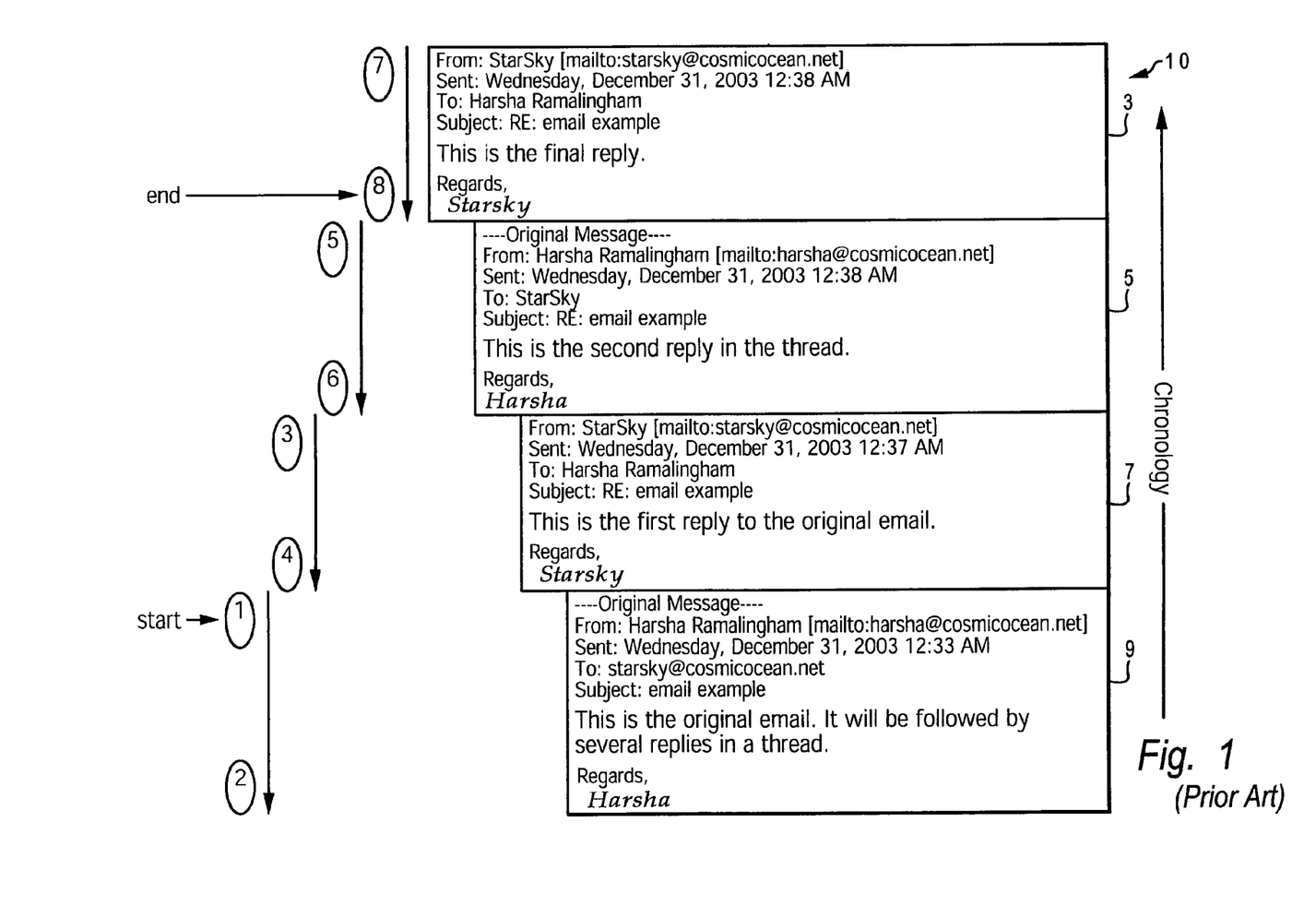
FIG. 1 illustrates a conventional multiple message e-mail thread display.

While such mechanisms provide an e-mail recipient with efficient e-mail response formulation and addressing, a significant problem remains relating to the inflexibility by which prior art e-mail clients display a multiple message e-mail thread. For example, and referring to FIG. 1, there is illustrated a multiple message e-mail thread display 10 as is known in the prior art. As shown in FIG. 1, the displayed thread 10 includes four messages 3, 5, 7, and 9, vertically arranged on the computer display screen (not depicted) in reverse chronological order (i.e. most recent on top). That is to say, the displayed vertical message order corresponding to the direction of conventional human reading order (i.e., top-to-bottom) is opposite to the chronological direction of the messages which begins at the bottom of the display with the initial originating thread message 9 and proceeds upward until it terminates with the most recent received reply message 3. This last-in-first-displayed message ordering enjoys the benefit of message review efficiency in that a recipient following or participating in the thread exchange will typically want the latest message posted at the top of the display.

While providing the convenience of displaying the last update, the foregoing conventional thread message ordering such as shown in FIG. 1 poses a significant problem relating to the ability of a given recipient, particularly a recipient newly added to the addressee list, to analyze and/or review a portion or all of the message list in order to understand or review the context of the message list discourse. Given the importance of chronology to human cognitive function, the most efficient way to understand the context of a sequential message list such as that shown in FIG. 1, is for the newly included thread recipient to scroll down to the beginning of the originating message 9 to the message beginning as depicted at the "start" step 1 read through the end of the message to the end step 2. The reader must then reverse directions to step 3, scrolling back up past message 9 to the top of message 7 and possible have to scroll downwardly as the end of message 7 is reached at step 4. The process continues similarly for message 5, scrolling up to step 5 and moving down to step 6, before the most recently received message 3 is similarly traversed at steps 7 and 8.

By requiring the reader to switch directions while traversing between messages, the foregoing procedure for reading a multiple message e-mail thread in chronological order, is inefficient in terms of time and energy expended manipulating the display, and more importantly, in terms of the reader maintaining his/her concentration. The extra time necessary for navigation and the loss of context by the reader during navigation, are both negatives for displaying the entire contents of an e-mail thread in this fashion. Inflexible chronological ordering of the displayed e-mail thread is an example of the significant problems and inefficiencies resulting from the lack of a user-controlled or autonomic e-mail thread display manager in the prior art.

From the foregoing, it can be appreciated that a need exists for an improved e-mail display system and method that provides a more flexible and user-friendly display of a multiple message e-mail thread. The present invention addresses this and other needs unresolved by the prior art.

SUMMARY OF THE INVENTION

A system, method and computer program product for managing display of a multiple message e-mail thread is disclosed herein. In accordance with the method of the invention, an e-mail message is accessed by an e-mail thread display module. The e-mail message includes multiple sections each having an associated section header including one or more header attributes. A user display preference based on one or more of the header attributes is received, and the e-mail message is displayed on a display device in accordance with the received user display preference.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT(S)

The present invention is generally directed to a method, system and computer program product for managing the display of an e-mail message comprising a thread of one or more sections each having a section header having header attributes. More specifically, the present invention is directed to method and system for displaying an e-mail message that enables the list of sections (referred to herein as an e-mail thread or thread) contained in the e-mail, or a selected portion thereof, to be sequentially displayed or filtered/grouped in accordance with user selected header attribute information. The invention provides a mechanism for managing the format and content of an e-mail display for various purposes, including facilitating the reading of a thread comprising many messages, thereby improving the efficiency with which a user may navigate and read an e-mail thread. In an e-mail client that by default displays an e-mail thread in reverse chronological order (see FIG. 1), the present invention enables a re-sequencing of the thread display to forward chronological order, enabling convenient and logical navigation of the document from the original message to the newest in a top-to-bottom direction that is consistent with most human language reading. Alternate embodiments of the invention utilize various header attribute data applied as sorting and/or masking criteria. As explained in further detail with reference to the figures, the present invention may be practiced as a message processing method and/or a data processing system adapted to implement the same, as well as a specialized e-mail message handling GUI to achieve the foregoing objectives.

The invention may also be practiced in distributed computing environments where tasks are performed by remote processing devices that are linked through a communications network. In a distributed computing environment, program modules may be located in both local and remote memory storage devices. Execution of the program modules may occur locally in a stand-alone manner or remotely in a client/server manner. Examples of such distributed computing environments include local area networks of an office, enterprise-wide computer networks, and the Internet. In a distributed computing environment, program modules may be located in both local and remote memory storage devices.

Figure 2:
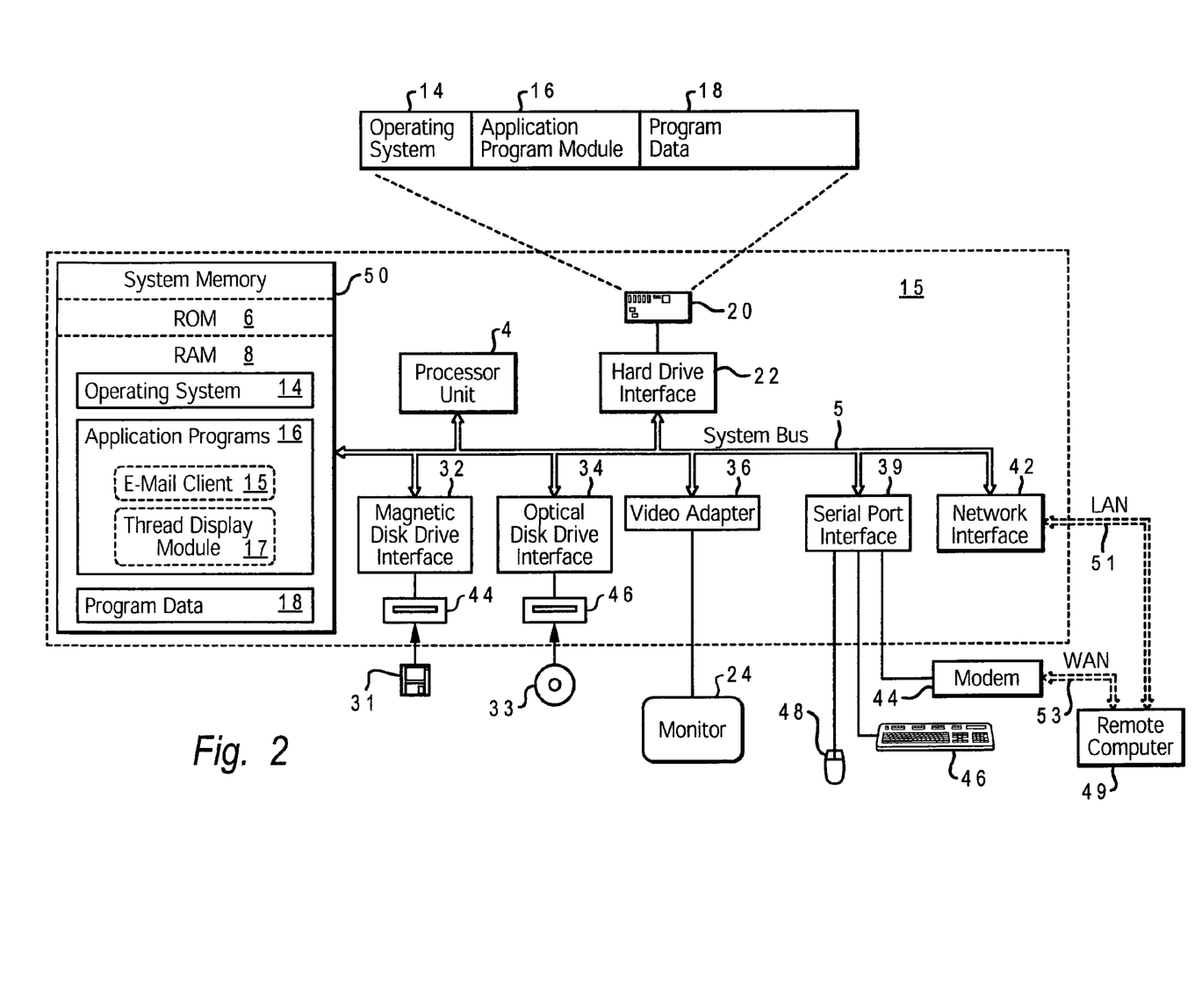
FIG. 2 is a simplified block diagram representation of a data processing system adapted for receiving, processing and displaying an e-mail thread in accordance with a preferred embodiment of the present invention.

With reference now to the figures, wherein like reference numerals refer to like and corresponding parts throughout, and in particular with reference to FIG. 2, there is depicted a data processing system adapted for implementing the present invention. For discussion purposes, the data processing system is described as a personal computer, such as a desktop or portable computer. However, as used herein, the terms "data processing system," "computer," and the like, are intended to mean essentially any type of computing device or machine that is capable of running a software product, including such devices as communication devices (e.g., pagers, telephones, electronic books, electronic magazines and newspapers, etc.) and personal and home consumer devices (e.g., handheld computers, Web-enabled televisions, home automation systems, multimedia viewing systems, etc.).

While the invention will be described in the general context of an application program that runs on an operating system in conjunction with a personal computer, those skilled in the art will recognize that the invention may also be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like.

The exemplary data processing system illustrated in FIG. 2 generally comprises a personal computer 15, having a processing unit 4, a system memory 50, and a system bus 5 that couples system memory 50 to processing unit 4. The system memory 50 includes read only memory (ROM) 6 and random access memory (RAM) 8. Personal computer 15 further includes a hard disk drive 20, a magnetic disk drive 44, e.g., to read from or write to a removable disk 31, and an optical disk drive 46, e.g., for reading a CD-ROM disk 33 or to read from or write to other optical media. Hard disk drive 20, magnetic disk drive 44, and optical disk drive 46 are connected to system bus 5 by a hard disk drive interface 22, a magnetic disk drive interface 32, and an optical drive interface 34, respectively. The drives and their associated computer-readable media provide non-volatile storage for personal computer 15. Although the description of computer-readable media above refers to a hard disk, a removable magnetic disk, and a CD-ROM disk, it should be appreciated by those skilled in the art that other types of media which are readable by a computer, such as magnetic cassettes, flash memory cards, digital video disks, Bernoulli cartridges, and the like, may also be used in the exemplary computer operating environment.

A number of program modules may be stored in the drives and system memory 50, including an operating system 14, application program modules 16, such as Microsoft's OFFICE suite of program modules, and program data 18.

A user may enter commands and information into personal computer 15 through a keyboard 46 and pointing device, such as a mouse 48. Other input devices (not shown) may include a microphone, joystick, game pad, satellite dish, scanner, or the like. These and other input devices are often connected to processing unit 4 through a serial port interface 39 that is coupled to the system bus, but may be connected by other interfaces, such as a game port or a universal serial bus. A monitor 24 or other type of display device is also connected to system bus 5 via an interface, such as a video adapter 36.

Personal computer 15 may operate in a networked environment using logical connections to one or more remote computers, such as a remote computer 49. The remote computer 49 may be a server, a router, a peer device or other common network node, and typically includes many or all of the elements described relative to personal computer 15. The logical network connections depicted in FIG. 2 include a local area network (LAN) 51 and a wide area network (WAN) 53. Such networking environments are commonplace in offices, enterprise-wide computer networks, Intranets and the Internet.

When used in a LAN networking environment, personal computer 15 is connected to LAN 51 through a network interface 42. When used in a WAN networking environment, personal computer 15 typically includes a modem 44 or other means for establishing communications over WAN 53, such as the Internet. The modem 44, which may be internal or external, is connected to system bus 5 via serial port interface 39. In a networked environment, program modules depicted relative to personal computer 15, or portions thereof, may be stored in one or more remote (i.e., network distributed) memory storage devices. It will be appreciated that the network connections shown are exemplary and other means of establishing a communications link between the computers may be used.

In accordance with the depicted embodiment, application programs 16 further includes an e-mail client application 15, such a may be included in a web browser application. E-mail client 15 includes program modules and instructions enabling an e-mail client addressee (i.e., an e-mail user having an e-mail address) to send, receive and organize e-mail messages over LAN 51 and/or WAN 53. Also included in application programs 16 is a thread display module 17 that manages the display of e-mail threads as explained in further detail below.

The present invention utilizes e-mail header information to manage message sequencing (i.e. ordering), filtering and other display characteristics. As utilized herein, the terms header, header attribute, and the like, refer to e-mail message control information preferably relating to message transport logistics such as e-mail address, deliver/receipt times, etc., typically found in Internet e-mail message headers. Other attributes may include priority data (e.g. urgency level), whether copying is permitted, return receipt, etc. As is well known in the art, such e-mail header information is contained and readily identifiable in a received e-mail message.

Figure 3A:
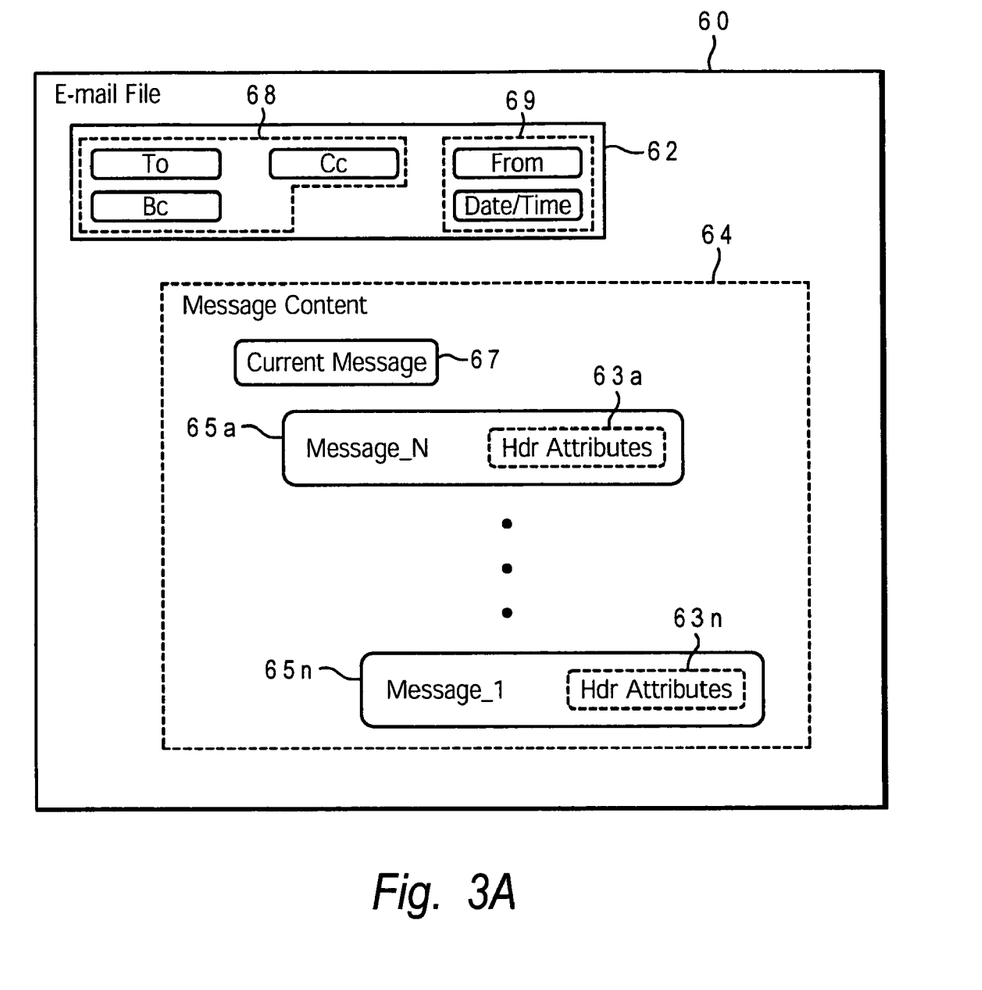
FIG. 3A is a simplified block diagram representation depicting an e-mail message file containing a multiple message thread.

Referring to FIG. 3A, there is depicted a simplified block diagram representing an e-mail message file 60 containing a multiple message e-mail thread such as may be received by an e-mail client addressee. E-mail message file 60 generally comprises a section header 62 containing header attributes 68 and 69 which are associated with a message section 64. Header attributes 68 and 69 comprise e-mail message delivery logistics data typically including sender and recipient network and personal address data as well as time/date stamps indicating when the object message is delivered and received.

The depicted header attributes 68 comprise a set of recipient attributes including a To attribute, indicating the recipient e-mail client address, and copy attributes Bc and Cc, which indicate other e-mail client addresses to which the object e-mail message file 60 is delivered. Included among header attributes 69 are sender attributes which include a From attribute indicating the e-mail client address from which message 60 was generated and delivered, and a Date attribute indicating the time and date on which the message was delivered to the network.

Associated with section header 62 is a message section 64 containing the current message subsection 67 included with e-mail file 60. Message section 64 further includes a thread 65 of one or more appended e-mail message sections 65*a*-65*n*. Each of sections 65*a*-65*n* are included as part of the message section 64 in accordance with well-known automatic e-mail addressing functions such as the Reply to and Forward to addressing functions, whereby the e-mail client may automatically, or in response to user selection, include legacy e-mail messages (i.e., e-mail messages belonging to one or more previously generated and delivered e-mail message files) with the current message. Each of legacy message sections 65*a*-65*n* furthermore includes its own associated section header 63*a*-63*n* containing corresponding header attribute data. For inter-application compatibility, the legacy header attributes within section headers 63*a*-63*n* generally corresponds categorically with the header attribute categories included within header attributes 68 and 69.

Figure 3B:
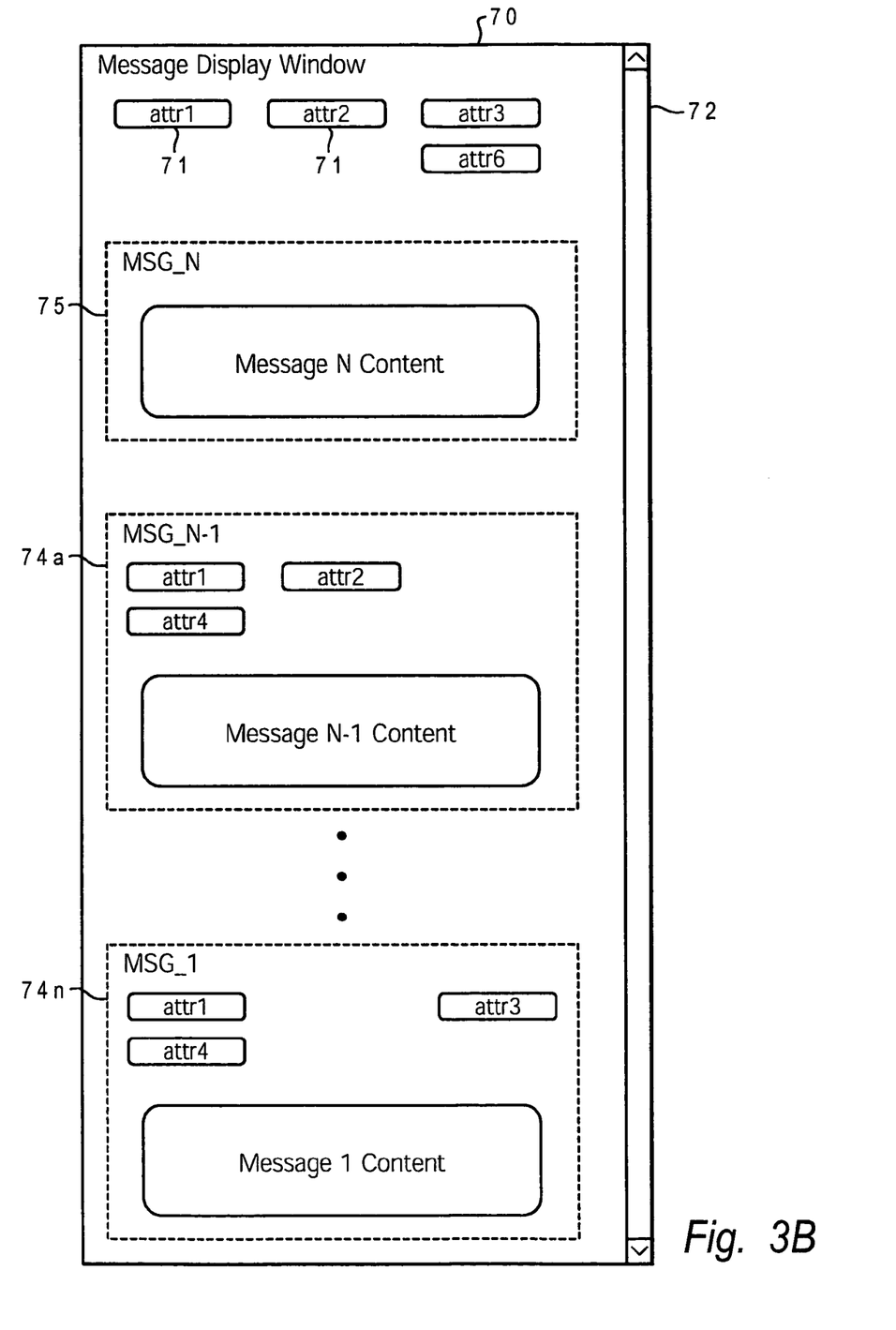
FIG. 3B is a simplified block diagram representation illustrating the displayed content of a multiple message e-mail thread.

After being received in the recipient's e-mail "mailbox," the message and header content of e-mail message file 60 may be displayed as shown in FIG. 3B, which depicts a simplified representation of the displayed content of an e-mail message. The display comprises a window content section 70 and a scroll bar 72 by which a user may vertically traverse the message contents. The objects within window 70 generally include a displayed object representation 71 of one or more of the header attributes 62 followed by a displayed object representation 75 of the current message 67. Below object 75, typically in reverse chronological order (i.e., displayed from top to bottom in order of most recent to oldest), is a list of display objects 74*a*-74*n* corresponding to legacy thread message sections 65*a*-65*n*. As explained in further detail below with reference to FIGS. 4, 5, 6A-6C, and 7A-7B, the method, system and computer program product of present invention provide a particularly effective mechanism for managing the content and formatting of a displayed e-mail thread sequence such as that shown in FIG. 3B.

Figure 4:
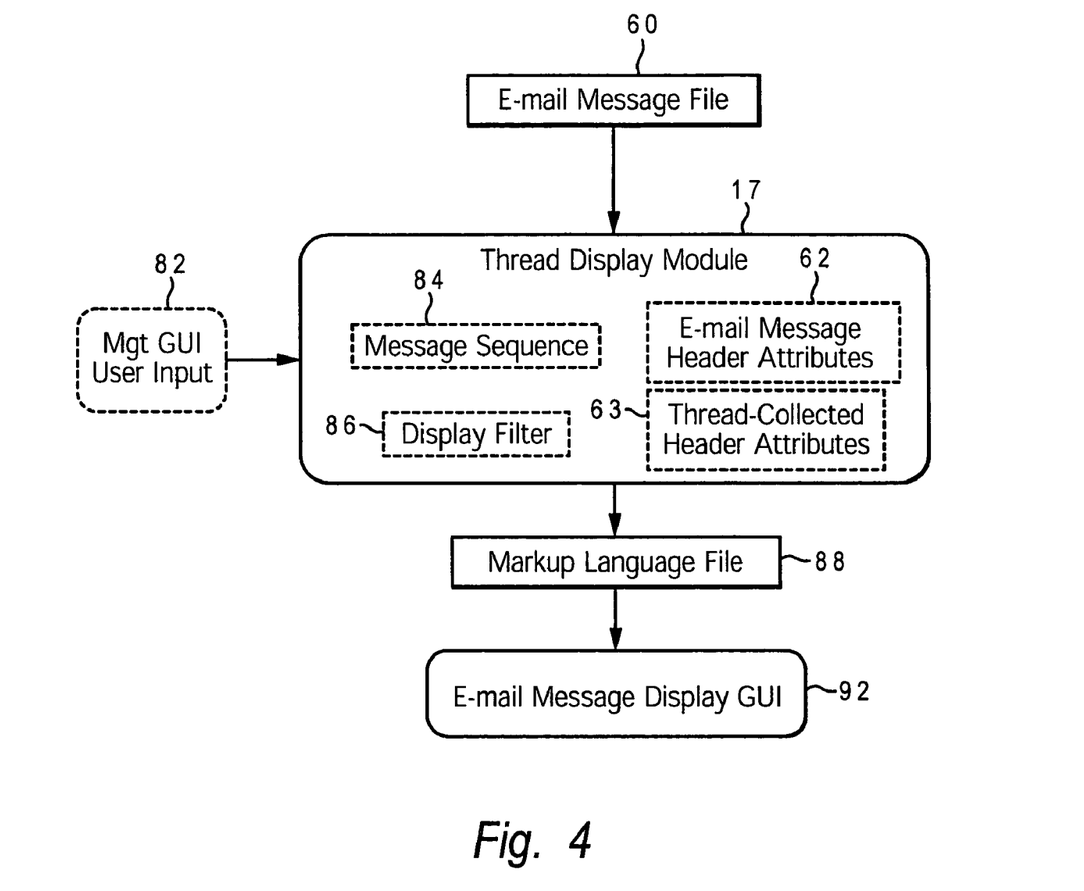
FIG. 4 is a simplified block diagram representation depicting an e-mail thread processing module in accordance with the present invention.

Referring to FIG. 4, there is illustrated a simplified block diagram representation of e-mail thread display module 17 in accordance with the present invention. As shown in FIG. 4, thread display module 17 receives input e-mail message file 60 including the message content and header attributes explained above with reference to FIG. 3A. Thread display module 17 generally comprises any combination of circuit modules, program modules, instructions and data for processing the content of e-mail message 60 to generate a display file such as a markup language display file 88 that may be displayed on a computer display device. As utilized in the present description and in the claims, the terms "display," "displaying," and similar terms refer alternatively to the overall process or any subpart or sub-process performed by thread display module 17 in generating markup language file 88 as described herein.

Thread display module 17 includes a message sequence module 84 that determines the sequence, or order, in which the e-mail thread message will be displayed as specified by markup language file 88 and as executed by an e-mail message display graphical user interface (GUI) 92. In one embodiment, an input specifying a sequential ordering of messages may be received with user input 82 and processed by message sequence module 84, which responds by processing the date-type header attribute data (the Date header attributes, for example) to order the message list in the e-mail in forward or reverse chronological order.

Thread display module 17 further includes a display filter module 86 that, like message sequence module 84, processes header attribute data of e-mail message file 60 in accordance with user-specified message display preferences. Display filter module 86 preferably includes electronic and/or program instruction means for determining the content and arrangement of the e-mail display (as specified by markup language file 88 or otherwise) in accordance with filter selection criteria such as one or more specified address names, e-mail or network addresses, etc. For example, and as depicted and explained with reference to FIGS. 6A and 6C, user input 82 may include filter instruction and header attribute data that instruct display module 17 to display the subset of the thread content of e-mail file 60 containing or excluding a specified sender name(s).

Examples of how thread display module 17 may be utilized to determine the content and format of an e-mail thread display are now described with reference to FIGS. 5, 6A-6C, and 7A-7B in conjunction with FIG. 4. Referring first to FIG. 6A, there is illustrated an e-mail thread display management GUI 150 as may be used by an e-mail client to provide a forum in which thread display module 17 processes user specified input 82. In the depicted embodiment, display management GUI 150 includes a window 152 containing an inbox object 154 that displays a list of e-mail messages labeled by sender name. Responsive to selecting one of the messages, such as by well-known pointer selection techniques, display management objects are displayed having display management options relating to the selected message. For example, responsive to selecting the message designated Sender_A, a message processing object 156 in the form of a drop-down menu is displayed. Among the various message processing options including an Open option, a Reply option, a Forward option, etc., is a user-selectable Message Display option that, when selected, provides the user a selectable menu of options for managing the content and display of the selected Sender_A e-mail message. The display management option menu is provided by a display management object 158 that displays user selectable Order, Filter and Default options.

Figure 6A:
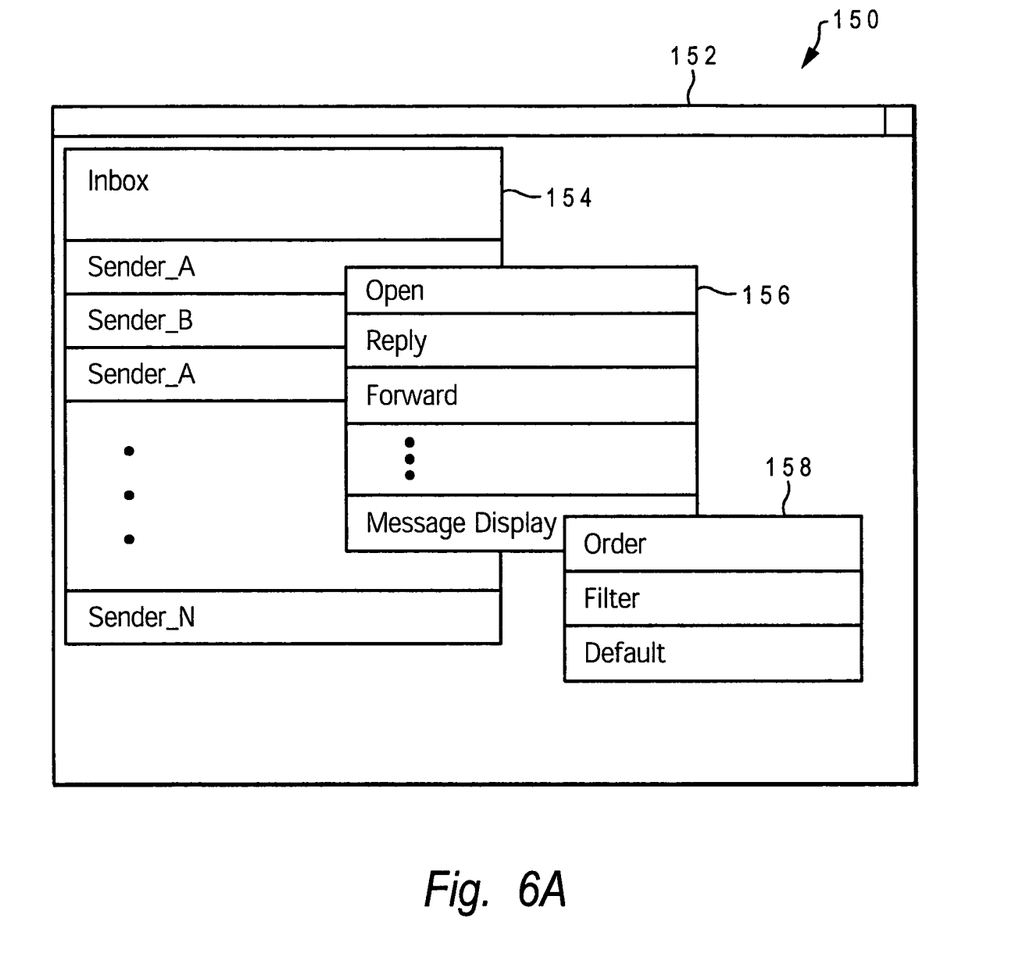
FIG. 6A illustrates an e-mail thread display management graphical user interface as may be employed by an e-mail client in accordance with the present invention.
Figure 6B:
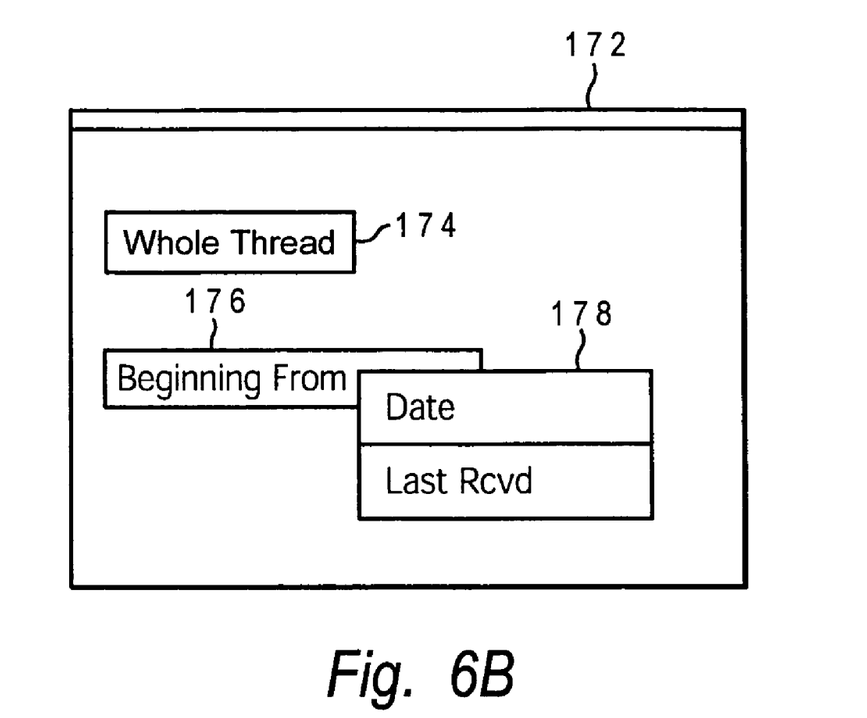
FIG. 6B depicts graphical user interface for managing a displayed e-mail thread sequence in accordance with the present invention.

Referring next to FIG. 6B, there is depicted a sequence management object 172 that is preferably displayed responsive to selecting the Order option within display management object 158. Sequence management object 172 provides a user interface for selecting the criteria processed by thread display module 17 to determining the chronological order or other display sequence for the selected e-mail thread. To this end, sequence management object 172 includes several display-ordering option buttons including a Whole Thread button 174 and a Beginning From button 176. User selection of Whole Thread button 174 results in GUI 150 delivering commands, instructions or data as input 82, prompting thread display module 17 to construct markup language file 88 in accordance with Date attributes such that the default chronological ordering of the thread messages is reversed. For example, e-mail client applications typically display an e-mail thread in reverse chronological order in which the most recent thread message is presented at the top of the display followed downwardly by the next most recent and continuing in like manner to the bottom of the presented thread list where the original thread message is displayed. In this case, selecting the Whole Thread button 174 prompts thread display module 17 to reverse the ordering of thread messages such that the messages are displayed in top to bottom in forward chronological order in which the original thread message is presented at the top of the display followed in correspondingly reversed order by the remaining messages.

As another feature of the embodiment depicted in FIG. 6B, the Beginning From object 176 provides a means by which the user can more selectively determine which portion of the thread is to be reversed. Specifically, responsive to user selection of the Beginning From object 176, a drop-down menu 178 is displayed which includes a Date option and a Last Rcvd option. By selecting Date, the user may further access an associated date entry field or suitable selectable object (not depicted) enabling the user to enter or select a specified date from or after which the thread message sequence is to be reversed. By selecting Last Rcvd, thread display module 17 is instructed to reverse the order beginning with the last message in the legacy thread 65 in which the current e-mail client addressee (addressee to whom the present e-mail message file was delivered) is included within the recipient address attributes in the legacy header attribute data 63. Thread display module 17 receives the specified reverse order command in conjunction with the specified Date or Last Rcvd parameters within management GUI user input 82 and processes the legacy header attributes in accordance therewith to determine the display content and/or sequence as explained in further detail below.

Figure 6C:
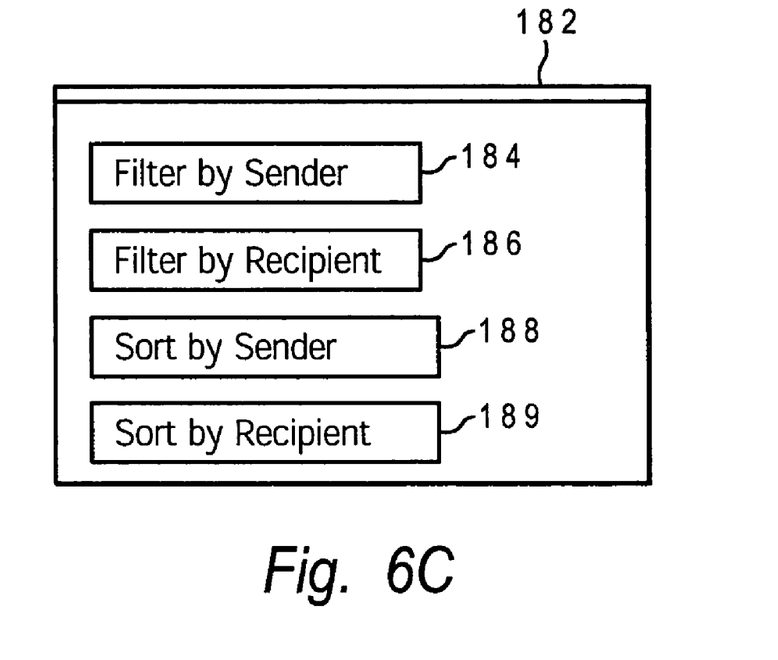
FIG. 6C illustrates a graphical user interface for filtering the messages displayed in an e-mail thread by addressee attributes in accordance with an alternate embodiment of the present invention.

Referring to FIG. 6C, there is depicted a thread filter object 182 preferably displayed responsive to selecting the Filter option within display management object 158. As shown in the depicted embodiment, thread filter object 182 includes a Filter by Sender object 184, a Filter by Recipient object 186, a Sort by Sender object 188, and a Sort by Recipient object 189, providing the user with three alternative thread display tools. Specifically, Filter by Sender object 184 provides a user-selectable forum by which thread processing tool 17 is instructed to mask, i.e. suppress display of, all thread messages having or not having a specified sender address included within the respective legacy header attributes 63. Similarly, the Filter by Recipient object 186 provides a user-selectable forum by which thread processing tool 17 is instructed to mask all thread messages having or not having a specified recipient address in legacy header attributes 63. Responsive to selection of objects 184 and 186, additional data entry fields or user selectable menus (not depicted) are provided in which the "sender" or "recipient" address or other user identifier may be specified as the filter criteria to be processed by thread display module 17.

The Sort by Sender and Sort by Recipient objects 188 and 189 provide another display management tool in which, by the addressee specification and processing techniques explained above, an e-mail thread message sequence can be re-organized such that all messages from or to a specified addressee(s) are grouped together in a displayed sequence. As with objects 184 and 186, additional data entry fields or menus (not depicted) are provided in association with objects 188 and 189 to receive user-specified sorting criteria for delivery to thread display module 17. In a preferred embodiment, message sequence module 84 includes electronic and/or program instructions for processing the header attributes contained in e-mail file 60 in accordance with the user-specified sorting criteria including at least one addressee identifier such that the thread messages are grouped into one or more sequentially contiguous groups in the display of e-mail file message 60 as specified by markup language file 88.

Figure 5:
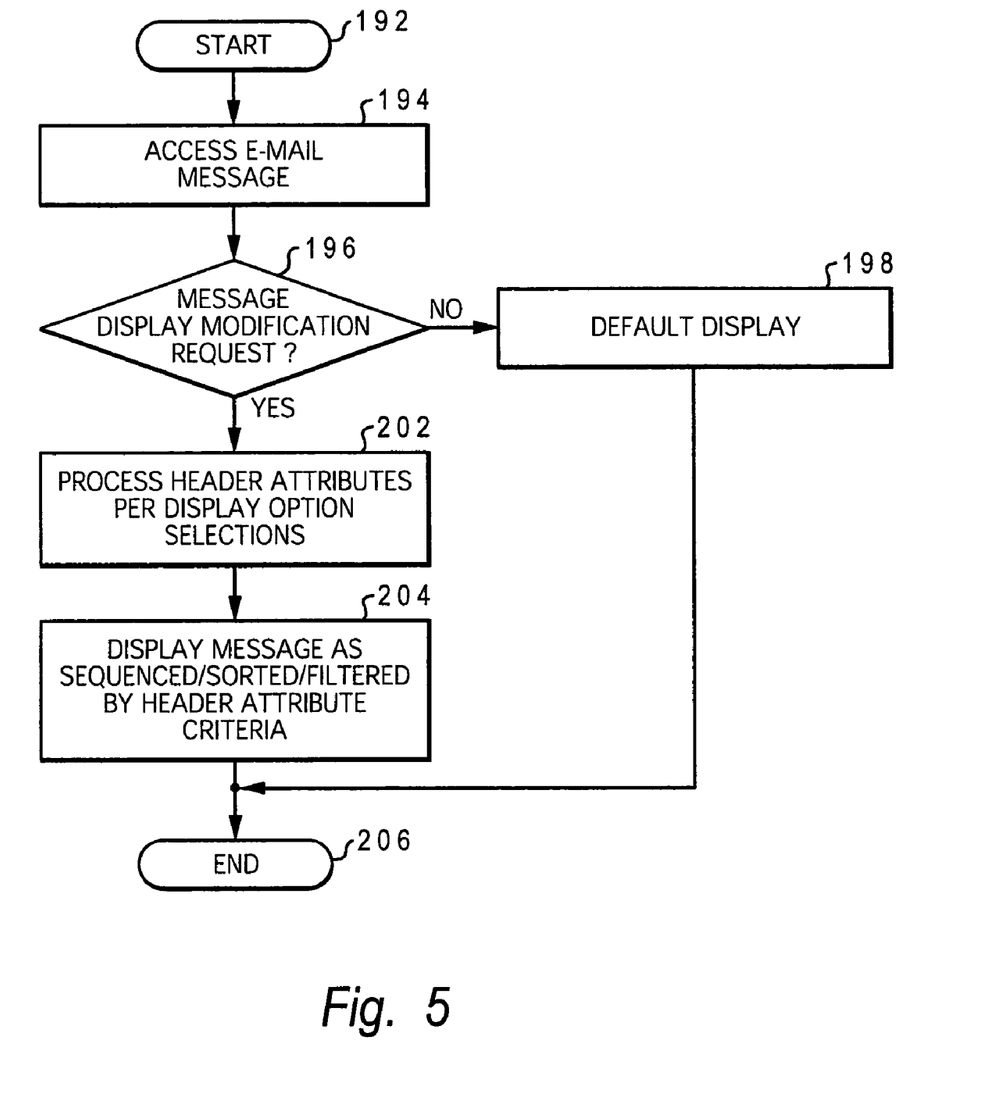
FIG. 5 is a flow diagram depicting steps performed during e-mail message processing in accordance with a preferred embodiment of the present invention.

FIG. 5 is a flow diagram depicting steps performed by e-mail processing means such as thread display module 17 during e-mail message processing in accordance with a preferred embodiment of the present invention. The process begins as illustrated at steps 192 and 194 with e-mail message file 60 being accessed such as by user-selection of e-mail message 60 from among a list in the user's e-mail inbox. As explained with reference to FIG. 6A, several user selection options are provided by the e-mail client GUI for determining whether and in what manner the selected message is to be displayed or otherwise processed. As depicted at steps 196 and 198, responsive to the user selecting the Open option and/or in the absence of a selection of a display modification option, the content of e-mail message file 60 is displayed in accordance with the e-mail client default message display settings.

If a message display modification option is selected, thread display module 17 processes the header attribute content of e-mail message 60 in accordance with the sequence or filter criteria provided in user input 82 via objects 172 and/or 182 (steps 196 and 202). Message sequence module 84, display filter module 86 and other electronic and/or program instruction means may be employed by thread processing module 17 in preparing the display file as depicted at step 204 and the process ends at step 206.

In an alternate embodiment of the present invention, such as that described with reference to FIGS. 7A and 7B, the processing and display formulation conducted by thread display module 17 may involve processing the data within one or more thread-collected header attributes 63 contained in the appended thread messages in conjunction with one or more of header attributes 62 of the received e-mail message file 60.

Figure 7A:
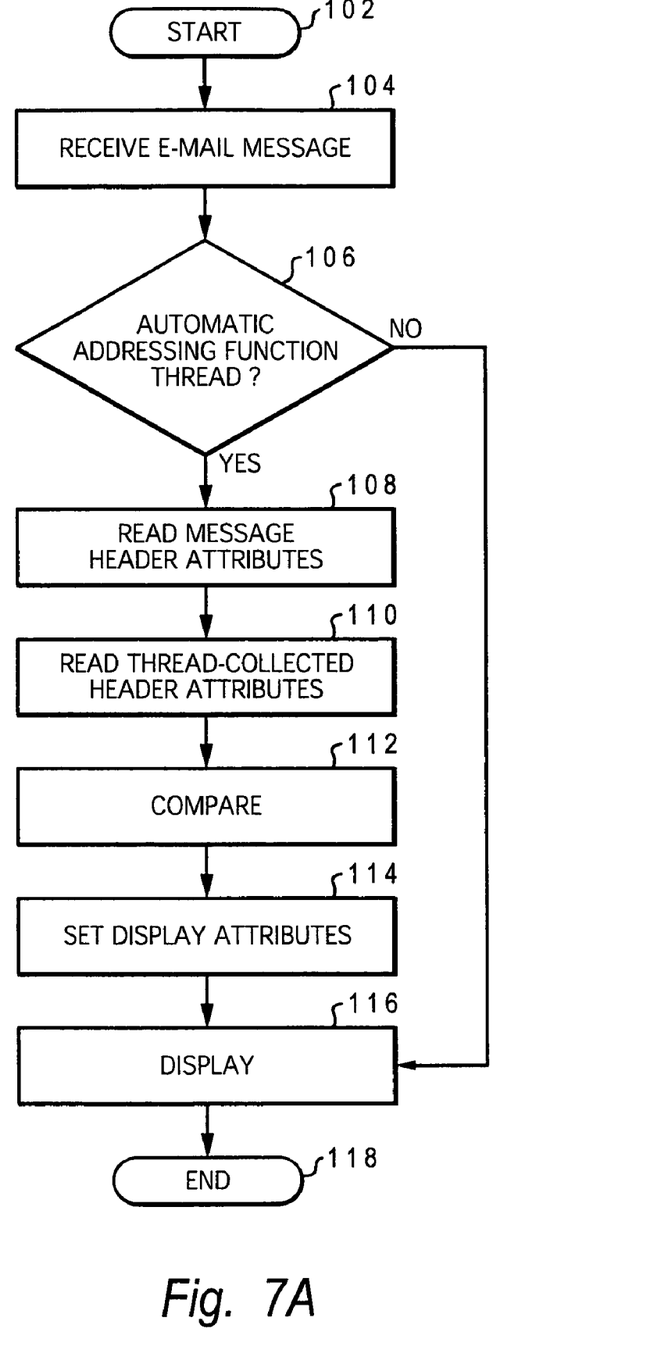
FIG. 7A is a flow diagram depicting steps performed during e-mail message processing in accordance with an alternate embodiment of the present invention.
Figure 7B:
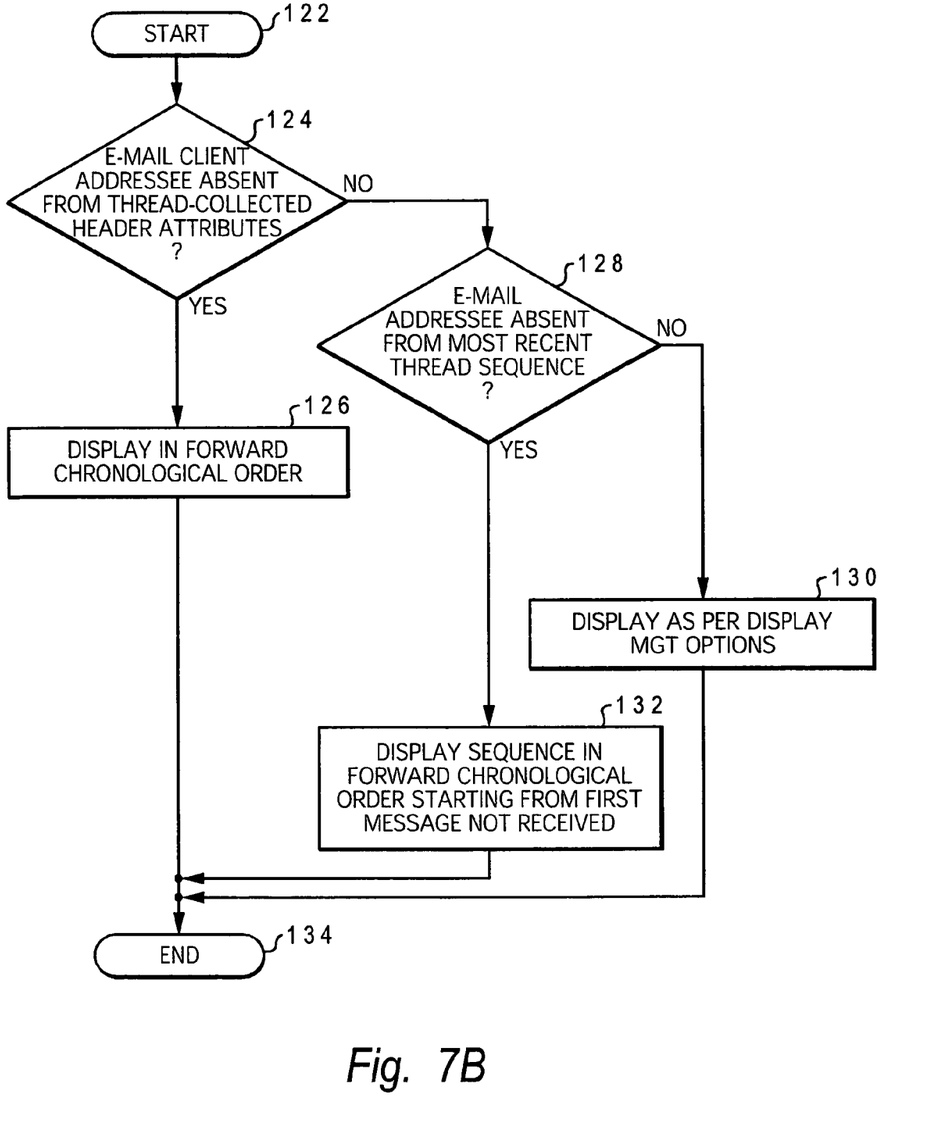
FIG. 7B is a flow diagram illustrating steps performed during e-mail display management in accordance with an alternate embodiment of the present invention.

Referring now to FIGS. 7A and 7B in conjunction with FIG. 4, there are illustrated flow diagrams depicting steps performed during autonomic e-mail message processing in accordance with an alternative embodiment of the present invention. The processes depicted in FIGS. 7A and 7B are particularly advantageous in determining the display attributes of a received e-mail message in accordance with a comparison of the current message header attributes 62 with the legacy header attributes 63. The process begins as shown at steps 102 and 104 of FIG. 7A with receipt of an e-mail message by an e-mail client that includes or is otherwise communicatively associated with thread display module 17. Specifically, the received e-mail is typically stored in a dedicated memory storage location that may be a private mailbox in which same-addressed e-mail is automatically stored for a specified e-mail client addressee.

Next, as depicted at step 106, thread display module 17 determines whether or not the received e-mail message contains an e-mail "thread" as defined herein. Such a determination is preferably made by examining the e-mail message header attributes 62 which, by common convention, indicates for example, whether the message is "In Reply To" another message. Responsive to determining the e-mail contains no thread of appended messages, the message may then be displayed (step 116) and the process ends (step 118). Responsive to determining at step 106 that the e-mail message contains a thread of one or more appended messages related as specified in header attributes 62 by a reply, copy, or forward addressing function, or otherwise, the message header attributes 62 are compared with the thread-collected header attributes 63 as illustrated at steps 108, 110 and 112. The process is completed with thread display module 17 setting the display attributes of the e-mail message in accordance with the comparison at step 112 (step 114) and the resultant display file being presented on a computer display (step 116) before the process ends at step 118.

Referring now to FIG. 7B, there is depicted a more detailed flow diagram illustrating steps performed during autonomic e-mail display management in accordance with the present invention. The process begins as shown at steps 122 and 124 with a determination by thread display module 17 of whether or not the e-mail client addressee (i.e., the addressee to which the current e-mail message was delivered) is identified, by e-mail address or otherwise, as being a recipient of any of the messages within legacy thread content 66. As depicted at steps 124 and 126, responsive to the e-mail client addressee being absent from the legacy header attributes 63, the e-mail thread is displayed in forward chronological order as defined previously and the process ends at step 134.

Responsive to determining that the e-mail client addressee is not "new" to the thread at step 124, the process continues as illustrated at step 128 with a determination of whether the current e-mail message represents the end of a message sequence gap during which the e-mail client addressee did not receive correspondence relating to the object thread. The determination shown at step 128 is preferably made by searching for the first instance of the client addressee's address or other identifier in the recipient addressee attributes of the legacy header attributes 63. Responsive to determining that as well as not being a "new" recipient of the thread, the e-mail client addressee has been included as a recipient of the most recently received legacy message 65a, the e-mail thread is displayed as per default or user-selected display management options (step 130). Otherwise, responsive to determining that while not a "new" thread recipient, the e-mail client addressee is absent from the recipient addressee attributes of a continuous and undivided sequence of one or more of the most recent thread messages, the e-mail thread is displayed in forward chronological order beginning with the first thread message of the undivided sequence not received by the client addressee (step 132) and the process ends at step 134.

The disclosed methods may be readily implemented in software using object or object-oriented software development environments that provide portable source code that can be used on a variety of computer or workstation hardware platforms. Whether software or hardware is used to implement the systems in accordance with this invention is dependent on the speed and/or efficiency requirements of the system, the particular function, and the particular software or hardware systems or microprocessor or microcomputer systems being utilized. The computer controlled display systems and methods described above, however, can be readily implemented in hardware and/or software using any known or later-developed systems or structures, devices and/or software by those skilled in the applicable art without undue experimentation from the functional description provided herein together with a general knowledge of the computer arts.

Moreover, the disclosed methods may be readily implemented as software executed on a programmed general purpose computer, a special purpose computer, a microprocessor, or the like. In this instance, the methods and systems of this invention can be implemented as a routine embedded on a personal computer such as a Java or CGI script, as a resource residing on a server or graphics workstation, as a routine embedded in a dedicated electronic message management system, a web browser, an electronic message enabled cellular phone, a PDA, a dedicated computer controlled display system, or the like. The computer controlled display system can also be implemented by physically incorporating the system and method into a software and/or hardware system, such as the hardware and software systems of a dedicated computer controlled display system.

While the invention has been particularly shown and described with reference to a preferred embodiment, it will be understood by those skilled in the art that various changes in form and detail may be made therein without departing from the spirit and scope of the invention. These alternate implementations all fall within the scope of the invention.

What is claimed is:

1. A method for displaying e-mail messages comprising:

accessing an e-mail message having a plurality of sections, wherein each of the plurality of sections includes an associated section header having header attributes;

receiving a user display preference based on one or more of the header attributes; and displaying said e-mail message on a display device in accordance with the received user display preference;

wherein said displaying comprises ordering the display of said plurality of sections in one of forward chronological order or reverse chronological order in accordance with the received user display preference;

wherein said displaying comprises filtering the display of said plurality of sections based on said user display preference, and said filtering comprises selectively including or excluding one or more of the plurality of sections in accordance with header attribute data specified in said received user display preference;

wherein said ordering step comprises grouping said plurality of sections into one or more sequentially contiguous groups in accordance with the received user display preference.

2. A system for displaying e-mail messages comprising:

a processor:

a memory component;

processing means associated with code executing on the processor for enabling the system to perform the functions of:

accessing an e-mail message having a plurality of sections, wherein each of the plurality of sections includes an associated section header having header attributes;

receiving a user display preference based on one or more of the header attributes;

displaying said e-mail message on a display device in accordance with the received user display preference, wherein said processing means for displaying comprises processing means for ordering the display of said plurality of sections in accordance with the received user display preference;

wherein said processing means for ordering comprises processing means for ordering said plurality of sections in forward chronological order or reverse chronological order;

wherein said processing means for ordering comprises processing means for grouping said plurality of sections into one or more sequentially contiguous groups in accordance with the received user display preference; and wherein said processing means for displaying comprises processing means for filtering the display of said plurality of sections based on said user display preference and said processing means for filtering comprises processing means for including or excluding one or more of the plurality of sections in accordance with header attribute data specified in said received user display preference.

3. A computer program product for displaying e-mail messages, said computer program product including computer-executable instructions on a computer storage medium for performing a plurality of functions when executed on a processor of a processing device, including functions for:

accessing an e-mail message having a plurality of sections, wherein each of the plurality of sections includes an associated section header having header attributes;

receiving a user display preference based on one or more of the header attributes;

displaying said e-mail message on a display device in accordance with the received user display preference;

wherein said displaying function comprises ordering the display of said plurality of sections in accordance with the received user display preference;

wherein said ordering function includes ordering said plurality of sections in forward chronological order or reverse chronological order;

wherein said ordering function includes grouping said plurality of sections into one or more sequentially contiguous groups in accordance with the received user display preference; and wherein said displaying function includes filtering the display of said plurality of sections based on said user display preference and said filtering function comprises including or excluding one or more of the plurality of sections in accordance with header attribute data specified in said received user display preference.

* * * * *